# (12) United States Patent
Dong

(10) Patent No.: US 11,544,501 B2
(45) Date of Patent: Jan. 3, 2023

(54) SYSTEMS AND METHODS FOR TRAINING A DATA CLASSIFICATION MODEL

(71) Applicant: PAYPAL, INC., San Jose, CA (US)

(72) Inventor: Yanfei Dong, Singapore (SG)

(73) Assignee: PayPal, Inc., San Jose, CA (US)

(*) Notice: Subject to any disclaimer, the term of this patent is extended or adjusted under 35 U.S.C. 154(b) by 973 days.

(21) Appl. No.: 16/294,174

(22) Filed: Mar. 6, 2019

(65) Prior Publication Data

US 2020/0285898 A1 Sep. 10, 2020

(51) Int. Cl.
*G06K 9/62* (2022.01)
*G06N 3/08* (2006.01)

(52) U.S. Cl.
CPC ............ *G06K 9/6257* (2013.01); *G06K 9/622* (2013.01); *G06K 9/6253* (2013.01); *G06K 9/6276* (2013.01); *G06N 3/08* (2013.01)

(58) Field of Classification Search
CPC .... G06K 9/6257; G06K 9/622; G06K 9/6253; G06K 9/6276; G06N 3/08
See application file for complete search history.

(56) References Cited

U.S. PATENT DOCUMENTS

| | | | | |
|---|---|---|---|---|
| 2004/0006398 A1* | 1/2004 | Bickford | ............. | G05B 23/021 706/14 |
| 2009/0097741 A1 | 4/2009 | Xu et al. | | |
| 2013/0097103 A1 | 4/2013 | Chari et al. | | |
| 2013/0118736 A1 | 5/2013 | Usadi et al. | | |
| 2016/0092789 A1 | 3/2016 | Codella et al. | | |
| 2017/0257653 A1* | 9/2017 | Farré Guiu | .......... | G06K 9/6215 |
| 2019/0098039 A1* | 3/2019 | Gates | .................. | G06F 21/6245 |
| 2020/0050945 A1* | 2/2020 | Chen | ...................... | G06N 3/084 |
| 2020/0167914 A1* | 5/2020 | Stamatoyannopoulos | .................. | G06T 7/0012 |
| 2020/0226489 A1* | 7/2020 | Li | .......................... | G06N 3/088 |
| 2020/0338599 A1* | 10/2020 | Shniberg | .................. | G06N 3/08 |

OTHER PUBLICATIONS

Dattagupta; "A Performance Comparison of Oversampling Methods for Data Generation in Imbalanced Learning Tasks"; Nova Information Management School, Master Program in Statistics and Information Management, 28 pages, Nov. 2017.

(Continued)

*Primary Examiner* — Qun Shen
(74) *Attorney, Agent, or Firm* — Haynes and Boone, LLP

(57) ABSTRACT

Methods and systems for training a computer-based classification model for classifying data are presented. The computer-based classification model is configured to classify data into one of a plurality of classifications. An initial training data set for training the classification model is obtained. In some embodiments, the training data within the initial training data set is grouped into multiple clusters, and training data within one or more clusters having corresponding ratio between a first classification and a second classification below a threshold ratio is removed from the initial training data set to generate the modified training data set. The modified training data set, instead of the initial training data set, is used to train the classification model.

20 Claims, 7 Drawing Sheets

(56) References Cited

OTHER PUBLICATIONS

Bellinger; "Beyond the Boundaries of SMOTE; a Framework for Manifold-based Synthetic Oversampling"; School of Electrical Engineering and Computer Science, Faculty of Engineering, University of Ottawa, 2016, 136 pages.

Douzas et al.; "Geometric SMOTE: Effective oversampling for imbalanced learning through a geometric extension of SMOTE"; NOVA Information Management School, Universidade Nova de Lisboa, pp. 1-22, Sep. 2017.

Bellinger et al.; "Manifold-based synthetic oversampling with manifold conformance estimation"; Mach Learn DO1 10.1007/sl0994-017-5670-4; 33 pages, Oct. 2017.

* cited by examiner

SYSTEMS AND METHODS FOR TRAINING A DATA CLASSIFICATION MODEL

BACKGROUND

The present specification generally relates to data classification, and more specifically, to an improved mechanism for training a data classification model.

RELATED ART

Data classification is a common problem across different types of organizations, such as retailers, medical institutions, financial institutions, and the like. For instance, in electronic commerce, an online merchant may receive millions of online transaction requests each day. In addition to providing adequate services to the users, the online merchant also needs to prevent unauthorized access to user accounts. For example, malicious users are known to use various tactics such as phishing or man-in-the-middle attacks to obtain credentials associated with user accounts, and perform unauthorized transactions using those user accounts. In these instances, the entity needs to classify incoming transaction requests as either authorized requests or unauthorized (e.g., fraudulent) requests such that the user accounts are protected from unauthorized access and use. For example, the entities may deny requests that are classified as possibly unauthorized. Furthermore, by denying the unauthorized requests, more processing power may be spent on processing the authorized requests, thus improving the service performance and quality for the legitimate users, while reducing the amount of computational power needed for processing and then remedying unauthorized requests.

A classification model can be used to assist in the data classification process. The classification model may be implemented as a machine learning model that can be trained using training data (e.g., historic data that is a priori classified (e.g., tagged or labeled)). Once a classification model is trained with the training data, the classification model may be able to classify new data (e.g., new incoming transaction requests) based at least in part on how the training data was classified. As such, the performance of the classification model (e.g., how accurate is the classification model in classifying data) may be largely based on the quality of the training data. In other words, using training data that is poorly labeled or classified may cause the classification model to perform poorly in classifying new data. Thus, there is a need for improving the quality of training data for training classification models.

Figure 1:
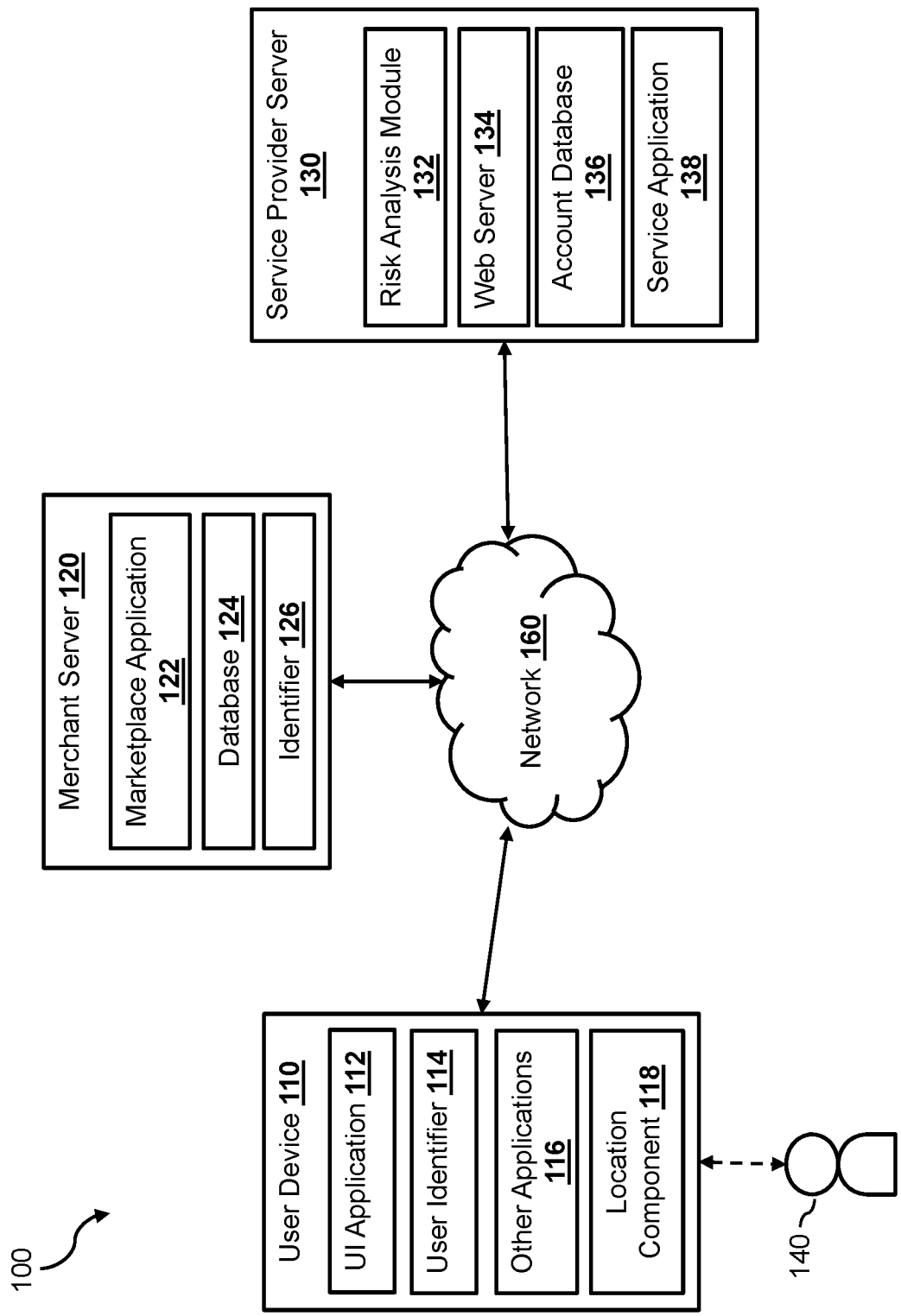
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for training a computer-based classification model for classifying data by selectively removing training data determined to be irrelevant or mislabeled. Once the classification model is trained, the classification model may be used to classify data into one of multiple classifications based on attributes (also referred to as "features") of the data. As discussed above, the performance of a classification model can be largely based on the quality of the training data used to train the classification model. The training data may include historic data that has been classified (e.g., labeled, tagged, etc.) in the past. In the example where the classification model is used to classify transaction requests into legitimate requests or fraudulent requests, the training data may include historic transaction requests that have been submitted and labeled as legitimate or fraudulent in the past.

However, it is common that at least some of the training data was mislabeled for a number of reasons. Using the example where the data to be classified includes transaction requests, some fraudulent transactions may not have been detected, and thus may be incorrectly labeled as legitimate. Conversely, some legitimate transaction requests may have been mistakenly labeled as fraudulent (e.g., through user exploits of an entity's reimbursement program, etc.), and the mistake was never reported or resolved. In addition, the logic and/or rules for classifying data may have changed over time, and thus, data that was classified one way under old rules may be classified the other way under new rules. The incorrectly labeled data (also referred to as "noisy data") used to train the classification model can detrimentally affect the performance of the classification model in classifying new data.

The noisy data problem is further exacerbated when the data being classified is imbalanced. The data is imbalanced when the proportion of the data being classified in one or more classes is substantially higher than the proportion of the data being classified in another class or classes. The ratio of the small class(es) to the large class(es) can be as drastic as 1 to 100, 1 to 1,000, 1 to 10,000, or even larger. Examples of data types having such an imbalanced classification include fraud/intrusion detection data, risk management data, text classification data, and medical diagnosis/monitoring data. When the data is imbalanced, the effect of any single mislabeled training data on the resulting performance of the classification model can be exaggerated.

Thus, according to various embodiments of the disclosure, a model generation system may improve the quality of the training data for training a classification model by removing at least a portion of the training data that is determined to be mislabeled or irrelevant in classifying data. The model generation system may obtain an initial training data set intended for training a computer-based classification model for classifying data into one of multiple classifications. The initial training data set may have imbalanced classifications where the proportion of the training data being labeled as first one or more classifications is substantially smaller than the proportion of the training data being labeled as second one or more classifications. Using the example where the initial training data set includes transaction request data that is classified into either legitimate transaction requests or fraudulent transaction requests, the proportion of the transaction request data labeled as fraudulent may be substantially smaller than the proportion of the transaction request data labeled as authorized or legitimate, as fraudulent transactions usually occur much less frequently than authorized/legitimate transactions in reality.

In some embodiments, the model generation system may determine a ratio between the first one or more classifications and the second one or more classifications in the initial training data set. For example, the model generation system may determine a ratio between fraudulent transactions and authorized transactions (e.g., 1 to 800, etc.) within the initial training data set. The model generation system may group the initial training data set into multiple clusters based on attributes of the initial training data set, for example, by using a Bayesian Gaussian Mixture Model or a K-means Clustering Algorithm. In some embodiments, the attributes used to group the initial training data set may be the same as the attributes used by the classification model to classify data. However, the number of attributes used by the classification model to classify data may be large (e.g., 500, 1000, etc.), and in order to enhance the performance of improving the training data set, the attributes may be reduced to a smaller number, such that a smaller, more manageable, dimension, may be used for grouping the training data set into the clusters in some embodiments. For example, a variational autoencoder may be used to reduce the attributes into a smaller number of representations of the attributes, where the smaller number of attribute representations generated for a data may accurately reflect the attributes of the data.

The ratio between the first one or more classifications and the second one or more classifications within each cluster may be determined, and one or more clusters having corresponding ratios below a predetermined threshold ratio may be identified. In some embodiments, the threshold ratio may be determined based on the ratio determined for the entire training set. For example, the threshold ratio may be a fraction (e.g., a percentage less than 100%) of the ratio determined for the entire training set.

Having a corresponding ratio lower than the threshold ratio may indicate that at least some of the training data included in the cluster is either irrelevant for classifying data, mislabeled, or both. For example, the high proportion of training data (e.g., almost all or even all) being labeled as the second one or more classifications in a cluster may indicate that the subset of the training data set corresponding to the cluster may be irrelevant to classifying data, as the subset of the training data does not differentiate from each other enough to indicate one classification from another. Furthermore, a large disparity between the corresponding ratio of classifications for the cluster and the ratio of classifications for the entire training set may indicate that at least some of the training data in the cluster is mislabeled.

Thus, after the one or more clusters having the corresponding ratios below the threshold ratio are identified, at least a portion of the training data included in the identified one or more clusters are removed from the training set. In some embodiments, all of the training data included in the identified one or more clusters may be removed from the training data set.

In some embodiments, the model generation system may iteratively perform the embedding of the attributes in attribute representations, the grouping of the training set into multiple clusters and the removing of training data from clusters having corresponding ratios below the threshold ratio by increasing the threshold ratio (e.g., increasing the threshold ratio by a percentage) at each iteration until a terminating condition is detected. The termination condition may include (1) none of the clusters have corresponding ratios below the threshold ratio and/or (2) the adjusted threshold ratio is above a cutoff ratio. Thus, the training data set may be trimmed at each iteration until a final training data set is determined. The final training data set may then be used to train the classification model. Since the final training data set is improved from the initial training data set by removing training data that is determined to be mislabeled or irrelevant in classifying data, the performance of the classification model being trained using the final training data set is also improved. The classification model is then used to classify data, for example, to classify incoming transaction requests as legitimate requests or fraudulent requests based on the final training data set.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to access account services or conduct electronic transactions (e.g., account transfers or payments) with the service provider server 130. Similarly, a merchant associated with the merchant server 120 may use the merchant server 120 to log in to a merchant account to access account services or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., online payment transactions, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server 130 includes a risk analysis module 132 that implements the model generation system as discussed herein. The risk analysis module 132 is configured to determine whether to authorize or deny an incoming request from the user device 110 or from the merchant server 120. The request may be a log-in request, a fund transfer request, a request for adding an additional funding source, or other types of requests associated with the variety of services offered by the service provider server 130. As such, when a new request is received at the service provider server 130 (e.g., by the web server 134), the risk analysis module 132 may analyze (or evaluate) the request and classify the request as a legitimate request or a fraudulent request based on information available to the risk analysis module (e.g., attributes of the request). The risk analysis module 132 may transmit the determined classification of the request (e.g., whether the request is a legitimate request or a fraudulent request) to the web server 134 and/or the service application 138 such that the web server 134 and/or the service application 138 may process (e.g., approve or deny) the request based on the indication.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to classify a request and determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
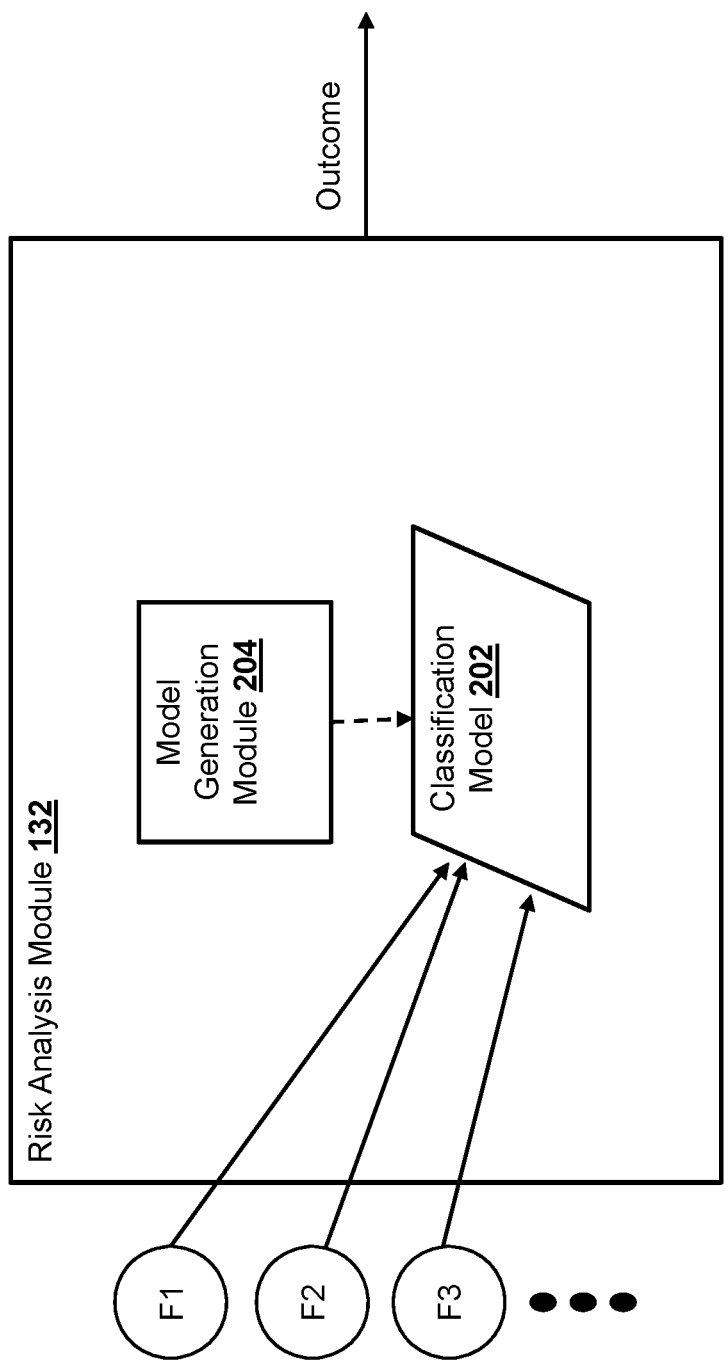
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a model generation module 204 and a classification model 202. The classification model 202 is a computer-based machine learning model that may be implemented in a variety of manners, such as an artificial neural network. Details of an artificial neural network that may be used to implement the classification model 202 is described below by reference to FIG. 5A. The classification model 202 may be configured to receive a set of input data (e.g., attributes of an item to be classified), such as feature 'F1' feature 'F2,' 'feature F3,' etc., and to produce a classification for the item based on the input data. For example, when the data to be classified include transaction requests, the input data may include attributes associated with a transaction request and the outcome may indicate whether the transaction request is classified as a legitimate request or a fraudulent request.

The model generation module 204 may generate the classification model 202 in part by training the classification model 202 using a training data set. In some embodiments, the training data set may include transaction requests that were previously submitted to the service provider server 130 from the user device 110 and/or the merchant server 120. As discussed above, each transaction request that was transmitted to the service provider server was analyzed to determine whether the request was a legitimate request or a fraudulent request. Thus, each historic transaction request in the training data set is also labeled as either a legitimate request or a fraudulent request, based on how the transaction request was classified. Furthermore, the training data set that was obtained initially (e.g., from the account database 136) may include noisy data, such as transaction requests that were mislabeled and/or transaction requests that were irrelevant in classifying future transaction requests. As such, the model generation module 204 of some embodiments may pre-process the training data set before using the training data set to train the classification model 202.

Figure 3:
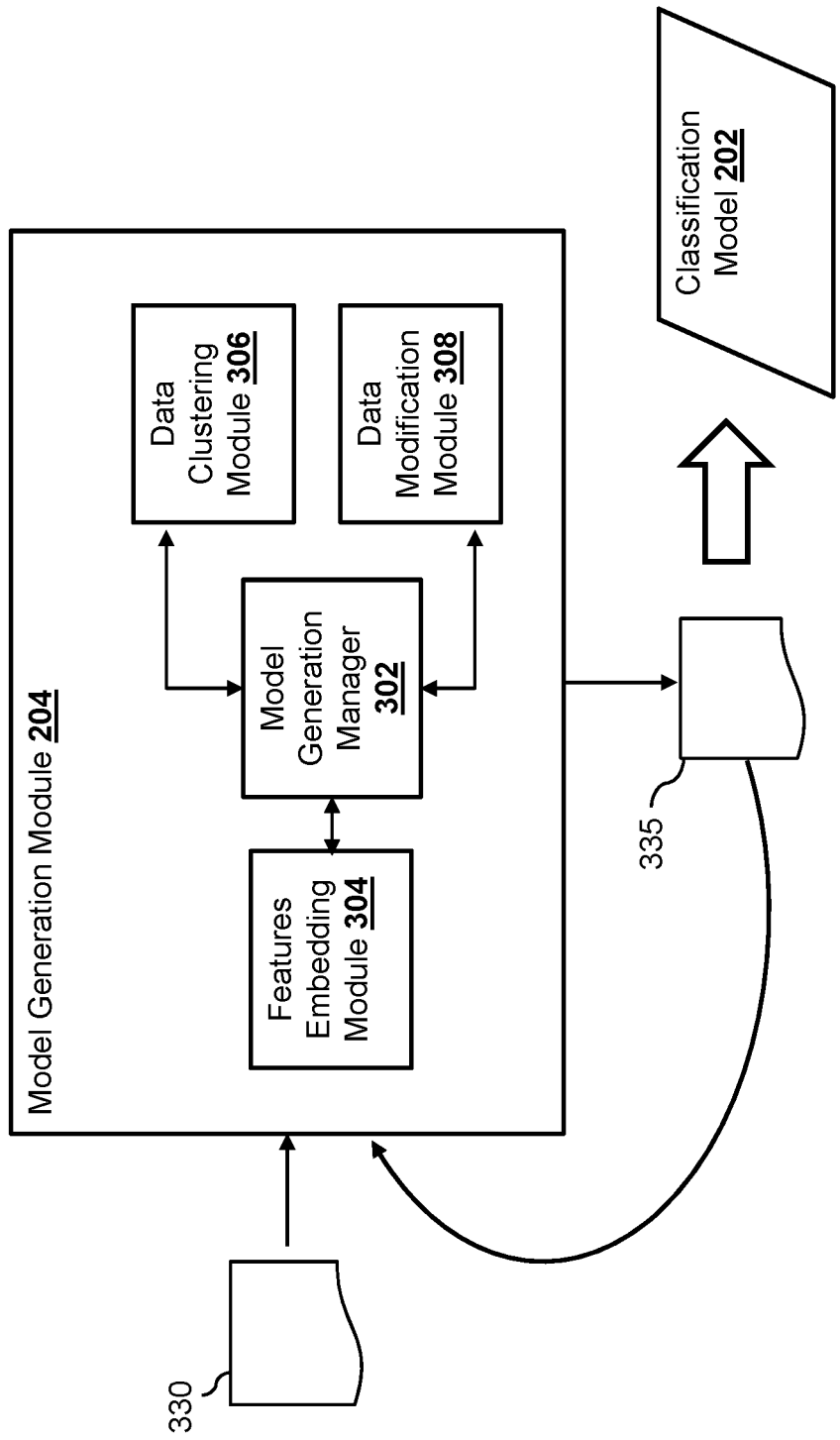
FIG. 3 is a block diagram illustrating a model generation module according to an embodiment of the present disclosure.

FIG. 3 illustrates a block diagram of the model generation module 204 according to an embodiment of the disclosure. The model generation module 204 includes a model generation manager 302, a features embedding module 304, a data clustering module 306, and a data modification module 308. The model generation manager 302 may receive an initial training data set 330, for example, from the account database 136. As discussed above, the number of attributes used by the classification model 202 may be large (e.g., 500, 1,000, etc.). Clustering the training data set using the attributes may require substantial time and processing power (e.g., for creating a space in a large number of dimensions proportional to the number of attributes). Thus, to enhance the performance of processing the training data, the model generation manager 302 may use the features embedding module 304 to embed the attributes into a smaller number of attribute representations. The data clustering module 306 may then group the training data in the training data set into different clusters based on the attribute representations. The data modification module 308 may modify the training data set 330 to generate a modified training data set 335 by removing certain training data from one or more clusters based on one or more criteria. The model generation manager 302 may iteratively perform the features embedding, data clustering, and training data modification until a terminating condition (e.g., no cluster having a corresponding ratio below the threshold ratio, the modified threshold ratio exceeds a cutoff ratio, etc.) is detected. The final training data set 335 may then be used to train the classification model 202.

Figure 4:
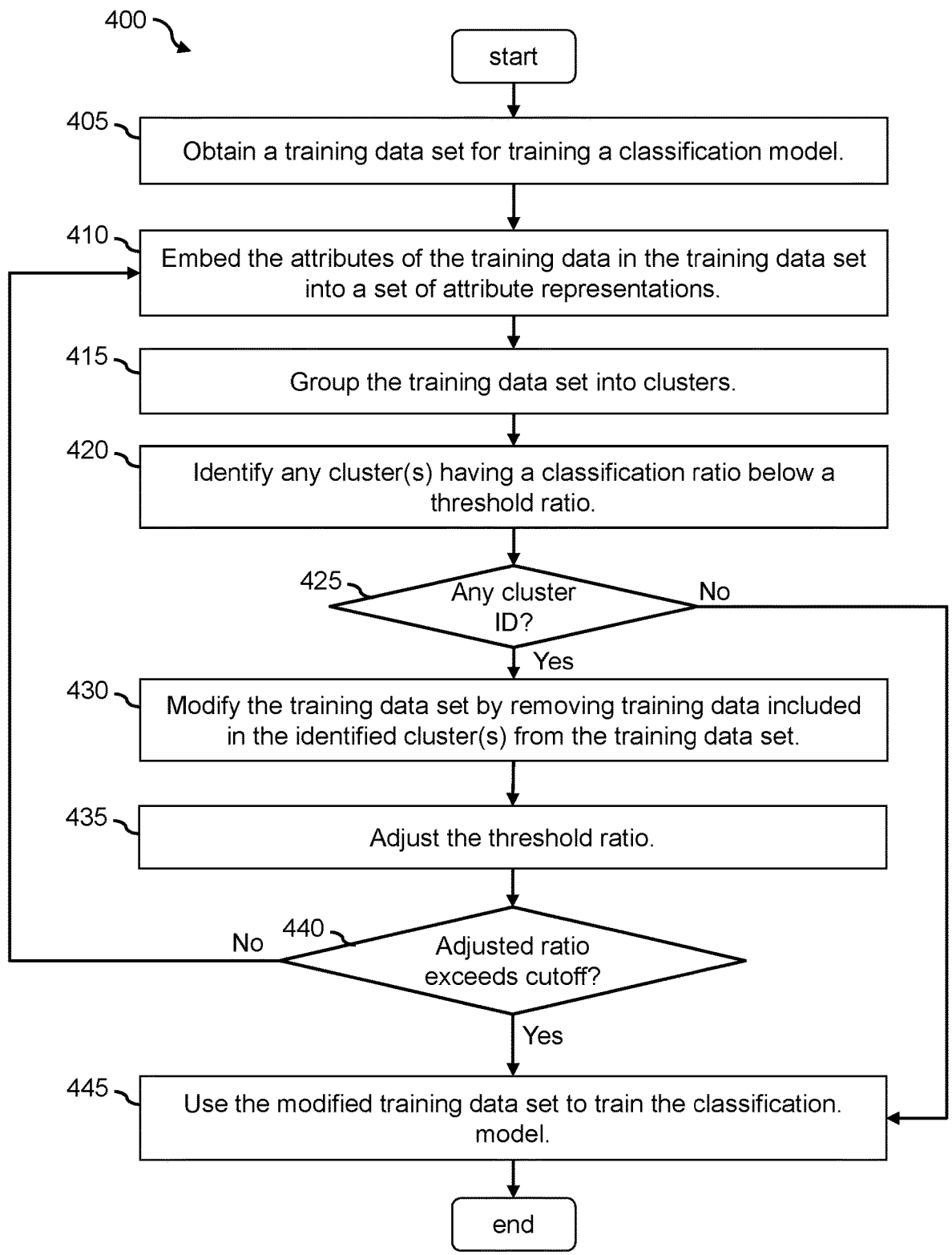
FIG. 4 is a flowchart showing a process of training a computer-based classification model for classifying data according to an embodiment of the present disclosure.

FIG. 4 illustrates a process 400 for training a classification model according to an embodiment of the disclosure. In some embodiments, the process 400 may be performed by the risk analysis module 132 (and specifically the model generation module 204) of the service provider server 130. The process 400 begins by obtaining (at step 405) an initial training data set for training a classification model. For example, the model generation manager 302 may obtain the initial training data set 330 from the account database 136. When a transaction request is received by the service provider server 130, the risk analysis module 132 may determine whether the transaction request is a legitimate request or a fraudulent request, for example, by using the classification model 202 and/or other computer-based models or rule engines. The service provider server 130 may authorize or deny the transaction request based on the determination and may record the transaction request (along with the attributes associated with the transaction request such as those that were used by the classification model 202 or other rule engines to classify the transaction request) in the account database 136. The service provider server 130 may also label the transaction request based on the determined classification (e.g., as a legitimate request or a fraudulent request, etc.).

As such, in some embodiments, the model generation manager 302 may obtain the initial training set 330 by querying the account database 136 for past transaction requests received by the service provider server 130 over a predetermined period of time (e.g., the past 5 years, the past 10 years, etc.). The initial training data set 330 may include training data associated with a set of transaction requests received by the service provider server 130 during the predetermined period of time. In addition, the training data associated with each transaction request may include the attributes associated with the transaction request and a label corresponding to the classification previously determined for the transaction request. In some embodiments, the model generation manager 302 may determine an overall classification ratio (e.g., an overall fraudulent transaction ratio) based on the labels associated with the training data in the initial training data set 330. For example, the model generation manager 302 may determine the overall classification ratio based on the number of transaction request records in the initial training data set 330 that are labeled as fraudulent transaction requests and the number of transaction request records in the initial training data set 330 that are labeled as legitimate transaction requests. As discussed above, since the initial training data set 330 has imbalanced classifications, the overall classification ratio determined for the initial training data set 330 would likely be within a range of 0.01% and 5%. In one example, the model generation manager 302 may determine the overall classification ratio for the initial training data set 330 to be 1% (or 1/100)—that is about 1 in 100 transaction requests in the initial training data set is labeled as a fraudulent request.

In some embodiments, the attributes of each transaction request may include information that is relevant for classifying the transaction request, such as an Internet Protocol (IP) address of a device (e.g., the user device 110) that submits that transaction request, a location of the device (e.g., the user device 110) that submits that transaction request, a type of transaction associated with the transaction request (e.g., a log-in request, a payment request, etc.), a payment amount associated with the request, an identity of a payee associated with the transaction request, a time when the transaction request is received, and other information.

As discussed above, the number of attributes associated with each transaction request may be large (e.g., 500, 1,000, etc.). Thus, in order to enhance the performance of processing the training data, the process 400 optionally embeds (at step 410) the attributes of the training data in the training data set 330 into a smaller set of attribute representations (e.g., 20, 50, etc. attribute representations). For example, the model generation manager 302 may use the features embedding module 304 to embed the attributes of the training data in the training data set 330 into a smaller set of attribute representations. In some embodiments, the features embedding module 304 may embed the attributes using a variational autoencoder that may be implemented as an artificial neural network. Details of the artificial neural network that implements such a feature embedding module 304 are described below by reference to FIG. 5B. In some embodiments, the variational autoencoder may include an encoder portion and a decoder portion. The encoder portion may take the set of attributes of each transaction request as input data and produce a smaller set of attribute representations that accurately represent the set of attributes. For example, the encoder portion may take a set of 500 attributes and may embed the 500 attributes into a set of 25 attribute representations. The encoder and decoder portions of the variational autoencoder is described in more details below by reference to FIG. 5B.

The decoder portion is the opposite of the encoder portion. In particular, the decoder portion may take the set of attribute representations as input data and may produce a set of attributes as the output data. Using the same example described above, the decoder portion may then take the 25 attribute representations as input data and may produce a set of 500 attributes as output data. By training the variational autoencoder to re-produce the same set of attributes that is input in the encoder portion as output data in the decoder portion based on the embedded attribute representations (e.g., through encoding the 500 attributes into 25 attribute representations and then decoding the 25 attribute representations to generate 500 attributes), the variational autoencoder may produce a smaller set of attribute representations that accurately represent the larger set of attributes associated with a transaction request.

After embedding the attributes of the training data included in the initial training data set 330 into attribute representations, the process 400 then groups (at step 415) the training data set into clusters. For example, the model generation manager 302 may use the data clustering module 306 to group the training data in the initial training data set 330 into multiple clusters based on the attribute representations of the training data. Different embodiments may use different techniques to group the training data. For example, one or more mixture models (e.g., a Bayesian Gaussian Mixture Model, etc.) and/or one or more clustering algorithms (e.g., a K-means clustering algorithm, etc.) may be used by the data clustering module 306 to group the training data in the initial training data set 330 into multiple clusters based on the attribute representations, such that the training data (e.g., the transaction requests) that is grouped into the same cluster are more similar to each other than training data (e.g., the transaction requests) that is grouped into different clusters based on the attribute representations.

The number of resulting clusters and/or other parameters used by the mixture model(s) and/or the clustering algorithm(s) for grouping the training data may be determined based on characteristics of the training data included in the initial training data set 330. In some embodiments, for the purpose of determining the number of resulting clusters and/or other parameters used by the mixture model(s) and/or the clustering algorithm(s) for grouping the training data, the attributes of the training data may be embedded into two attribute representations using the features embedding module 304 such that a two-dimensional graph of the training data may be presented to a user. Based on the two-dimensional graph, the user may then determine the number of resulting clusters and/or other parameters based on how the training data are scattered on the two-dimensional graph. In some embodiments, when the step 410 of embedding the attributes is not performed by the process 400, the grouping of the training data may be performed based on the actual attributes included in the initial training data set 330 instead of the attribute representations.

Once the training data is grouped into multiple clusters, the process 400 identifies (at step 420) any cluster(s) having a classification ratio below a threshold ratio. For example, the model generation manager 302 may calculate a classification ratio for each of the clusters. In some embodiments, the model generation manager 302 may determine, for each classification, a number of training data records labeled under the classification. Using the example discussed herein where the classification model 202 is for classifying transaction requests as legitimate requests or fraudulent requests, the model generation manager 302 may determine, for each cluster, a ratio between fraudulent requests and legitimate requests based on the number of transaction requests included in the cluster labeled as fraudulent requests and the number of transaction requests included in the clusters labeled as legitimate requests. When there are only two classifications available for the classification model 202 to classify data, the classification ratio may be determined based on a first classification over a second classification. On the other hand, when there are more than two classifications available for the classification model 202 to classify, the classification ratio may be determined based on a first classification over second one or more classifications (e.g., the remaining classifications), or based on first one or more classifications over second one or more classifications.

Once the corresponding classification ratio is determined for each of the clusters, the data modification module 308 may then identify one or more of the clusters having the corresponding classification ratio below a predetermined threshold ratio. Different embodiments may use different techniques to determine the threshold ratio. In some embodiments, the data modification module 308 may determine the threshold ratio based on the overall classification threshold determined for the entire training data set 330. For example, the data modification module 308 may determine the threshold ratio to be a fraction (e.g., a percentage less than 100% such as 50%, 60%, 70%, 80%, etc.) of the overall classification ratio. Using the example given above, when the overall classification ratio was determined to be 1/100, the data modification module 308 may determine the threshold ratio to be 1/200 (50% of the overall classification ratio). As such, the threshold ratio may vary depending on the characteristics of the training data set 330. Furthermore, the threshold ratio may also become smaller as the precision of the model improves or when the noise is mitigated.

A cluster having a corresponding classification ratio below the threshold ratio indicates that the training data within the cluster is either irrelevant to the data classification and/or that at least some of the training data within the cluster is mislabeled. As used herein, training data that is determined to be irrelevant to the data classification may include attributes that are not useful in classifying data. As such, using training data that is irrelevant to the data classification is inefficient, and sometimes even misleading for the classification model 202, and thus reduces the performance (e.g., classification accuracy) of the classification model 202. Furthermore, since the initial training data set 330 has imbalanced classification, where training data labeled as first one or more classifications (e.g., the fraudulent request classification) is substantially less than training data labeled as second one or more classification (e.g., the legitimate request classification) (e.g., at a low ratio such as 1/100, 1/1,000 or even lower), using training data that is mislabeled (e.g., a fraudulent request that was mislabeled as a legitimate request, etc.) to train the classification model 202 may confuse the classification model 202, and as a result, drastically reduce the performance of the classification model 202.

As such, the process 400 determines (at step 425) whether there is any cluster identified to have a corresponding classification ratio below the threshold ratio and modifies (at step 430) the training data set by removing at least a portion of the training data included in the identified cluster(s) from the training data set. For example, if it is determined that one or more clusters have corresponding classification ratios below the threshold ratio, the data modification module 308 may remove at least some of the training data from the one or more clusters. In some embodiments, the data modification module 308 may modify the training data set 330 by removing all of the training data in the one or more clusters from the training data set 330 to generate a modified training data set 335.

In some embodiments, the model generation manager 302 may use the modified training data set 335 to train the classification model 202. Using the modified training data set 335, instead of the initial training data set 330, to train the classification model 202 offers many benefits. For example, the initial training data set 330 may include training data that is irrelevant in the data classification and/or training data that was mislabeled. Irrelevant data and/or mislabeled data is especially detrimental in training a classification model where the training data set has imbalanced classification, as discussed herein. Thus, a classification model 202 that is trained using the modified training data set 335 (where at least a portion of the irrelevant data and/or mislabeled data is removed from the initial training data set 330) provides improved performance (e.g., improved classification accuracy) over the same classification model 202 that is trained using the initial training data set 330 instead.

In some embodiments, the process 400 may remove irrelevant and/or mislabeled training data from the training data set multiple times, using a different threshold ratio each time, before training a classification model using the modified training data set. For example, after modifying the training data set at the step 430, the process 400 adjusts (at step 435) the threshold ratio and iterates through the steps 410-435 until one or more termination conditions are detected. In some embodiments, the termination conditions may include at least one of: a condition that no cluster is identified to have a corresponding classification ratio below the threshold ratio or a condition that the adjusted ratio (adjusted in the step 435) exceeds a cutoff ratio. Thus, when it is determined at the step 425 that no cluster is identified to have a corresponding classification ratio below the threshold ratio, the process 400 uses (at step 445) the modified training data set to train the classification model. Similarly, after the threshold ratio is adjusted at the step 435, when it is determined (at step 440) that the adjusted threshold ratio exceeds a cutoff ratio, the process proceeds to the step 445 to use the modified training data set to train the classification model. On the other hand, if it is determined (at the step 440) that the adjusted threshold ratio does not exceed the cutoff ratio, the process 400 iterates through the steps 410 to 440.

Thus, the model generation module 204 may feed the modified training data set 335 back through the features embedding module 304, the data clustering module 306, and the data modification module 308 to continue to remove irrelevant and/or mislabeled training data from the training data set 335 multiple times before using the modified training data 335 to train the classification model 202. In some embodiments, the model generation module 204 may adjust the threshold ratio in each iteration. For example, every time after the training data set is modified, the model generation manager 302 may adjust the threshold ratio by increasing the threshold ratio. In some embodiments, the model generation manager 302 may increase the threshold ratio by a percentage (e.g., increase the previously used threshold ratio by 5%, 10%, etc.) or by a predetermined amount (e.g., increase the previously used threshold ratio by 1/1000, 1/500, etc.). The model generation manager 302 may then feed the modified training data set 335 through the features embedding module 304, the data clustering module 306, and the data modification module 308 to remove additional training data using the techniques disclosed herein.

In some embodiments, the model generation manager 302 may continue to remove irrelevant and/or mislabeled data using the same techniques disclosed herein iteratively until a termination condition is detected. For example, the model generation manager 302 may terminate the modification of training data when it determines that no cluster having a corresponding classification ratio exceeds the threshold ratio during an iteration. In addition, the model generation manager 302 may also terminate the modification of training data when the adjusted threshold ratio exceeds a predetermined cutoff ratio. In some embodiments, the model generation manager 302 may determine the cutoff ratio based on the overall classification ratio determined for the initial training data set 330. For example, the model generation manager 302 may determine the cutoff ratio to be the same as the overall classification ratio determined for the entire training set or a fraction (e.g., a percentage such as 90%, 80%, etc.) of the overall classification ratio. In some embodiments, the model generation manager 302 may determine a new overall classification ratio for the newly modified training data set 335 at each iteration, and the threshold ratio and/or the cutoff ratio may be determined based on the new overall classification ratio at each iteration. Once the termination condition is detected, the model generation manager may use the latest modified training data set 335 to train the classification model 202. The classification model 202 that has been trained using the modified training data set 335 may be used by the risk analysis module 132 to classify new data (e.g., incoming transaction requests received by the service provider server 130).

Figure 5A:
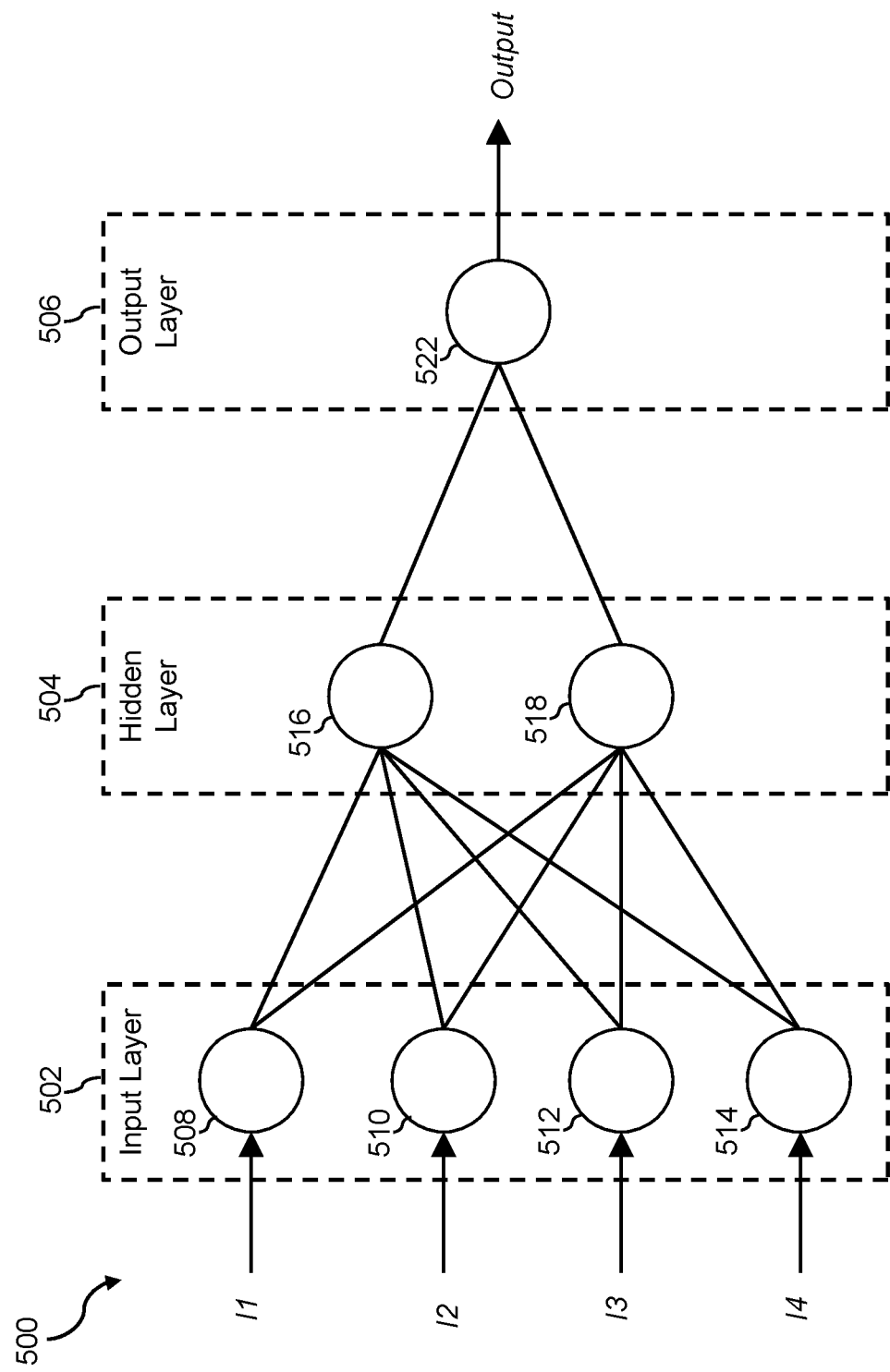
FIG. 5A illustrates an exemplary artificial neural network according to an embodiment of the present disclosure.

FIG. 5A illustrates an example artificial neural network 500 that may be used to implement the classification model 202. As shown, the artificial neural network 500 includes three layers—an input layer 502, a hidden layer 504, and an output layer 506. Each of the layers 502, 504, and 506 may include one or more nodes. For example, the input layer 502 includes nodes 508-514, the hidden layer 504 includes nodes 516-518, and the output layer 506 includes a node 522. In this example, each node in a layer is connected to every node in an adjacent layer. For example, the node 508 in the input layer 502 is connected to both of the nodes 516-518 in the hidden layer 504. Similarly, the node 516 in the hidden layer is connected to all of the nodes 508-514 in the input layer 502 and the node 522 in the output layer 506. Although only one hidden layer is shown for the artificial neural network 500, it has been contemplated that the artificial neural network 500 used to implement the classification module 202 may include as many hidden layers as necessary.

In this example, the artificial neural network 500 receives a set of input values and produces an output value. Each node in the input layer 502 may correspond to a distinct input value. For example, when the artificial neural network 500 is used to implement the classification model 202, each node in the input layer 502 may correspond to a distinct attribute of a piece of data to be classified. When the piece of data to be classified corresponds to a transaction request, each node in the input layer 502 may correspond to an attribute of the transaction request. In a non-limiting example, the node 508 may correspond to an IP address, the node 510 may correspond to a location of a device that initiates the request, the node 512 may correspond to an amount associated with the request, the node 514 may correspond to a time when the request was initiated, and so forth.

In some embodiments, each of the nodes 516-518 in the hidden layer 504 generates a representation, which may include a mathematical computation (or algorithm) that produces a value based on the input values received from the nodes 508-514. The mathematical computation may include assigning different weights to each of the data values received from the nodes 508-514. The nodes 516 and 518 may include different algorithms and/or different weights assigned to the data variables from the nodes 508-514 such that the nodes 516-518 may produce different values based on the same input values received from the nodes 508-514. In some embodiments, the weights that are initially assigned to the features (or input values) for each of the nodes 516-518 may be randomly generated (e.g., using a computer randomizer). The values generated by the nodes 516 and 518 may be used by the node 522 in the output layer 506 to produce an output value for the artificial neural network 500. When the artificial neural network 500 is used to implement the classification model 202, the output value produced by the artificial neural network 500 may indicate a classification (e.g., a fraudulent transaction, a legitimate transaction, etc.) based on the input attributes of a transaction request.

The artificial neural network 500 may be trained by using training data. By providing training data to the artificial neural network 500, the nodes 516-518 in the hidden layer 504 may be trained (adjusted) such that an optimal output (e.g., a classification) is produced in the output layer 506 based on the training data. By continuously providing different sets of training data, and penalizing the artificial neural network 500 when the output of the artificial neural network 500 is incorrect (e.g., when the output classification does not match the label associated with the item in the case of a classification model), the artificial neural network 500 (and specifically, the representations of the nodes in the hidden layer 504) may be trained (adjusted) to improve its performance in data classification. Adjusting the artificial neural network 500 may include adjusting the weights associated with each node in the hidden layer 504.

Figure 5B:
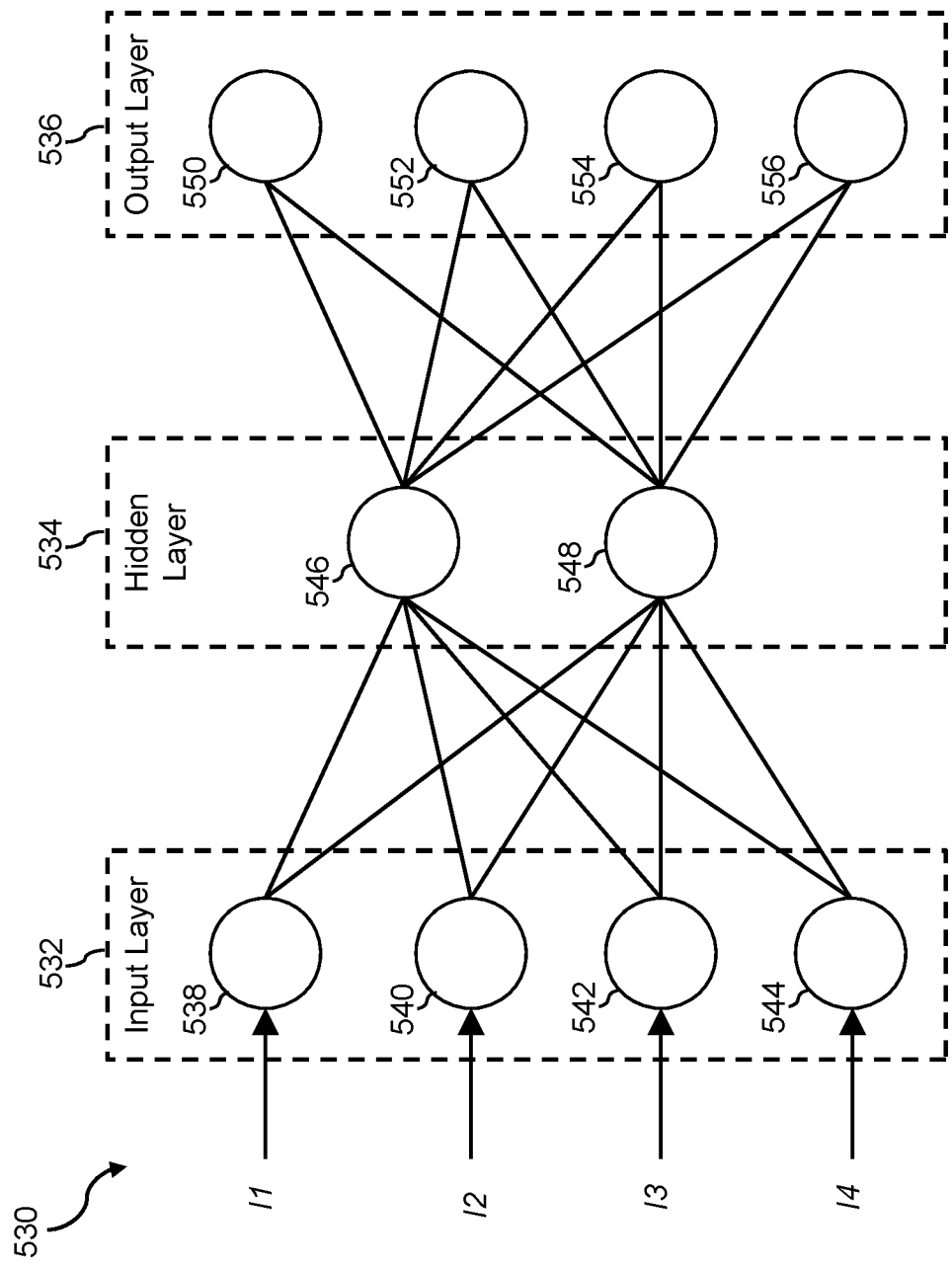
FIG. 5B illustrates another exemplary artificial neural network according to an embodiment of the present disclosure.

FIG. 5B illustrates another example artificial neural network 530 that may be used to implement the variational autoencoder that is used by the features embedding module 304. The artificial neural network 530 is similar to the artificial neural network 500 as they both include three different layers of nodes. As shown, the artificial neural network 530 includes three layers—an input layer 532, a hidden layer 534, and an output layer 536. Each of the layers 532, 534, and 536 may include one or more nodes. For example, the input layer 532 includes nodes 538-544 and the hidden layer 534 includes nodes 546-548. However, unlike the artificial neural network 500, the output layer 536 of the artificial neural network 530 includes multiple nodes 550-556. In some embodiments, the output layer 536 may include the same number of nodes as the input layer 538.

In this example, the artificial neural network 530 receives a set of input values and produces a set of output values. Each node in the input layer 532 may correspond to a distinct input value. For example, when the artificial neural network 530 is used to implement the variational autoencoder, each node in the input layer 532 may correspond to a distinct attribute (e.g., feature) of a piece of data to be classified. When the piece of data to be classified corresponds to a transaction request, each node in the input layer 532 may correspond to an attribute of the transaction request. In a non-limiting example, the node 538 may correspond to an IP address, the node 540 may correspond to a location of a device that initiates the request, the node 542 may correspond to an amount associated with the request, the node 544 may correspond to a time when the request was initiated, and so forth. In this example, the artificial neural network 530 is configured to re-produce the input values in the output layer 536. As such, each of the nodes 550-556 in the output layer 536 may correspond to the same distinct attribute (e.g., feature) of a piece of data to be classified. In a non-limiting example, the node 550 may correspond to an IP address, the node 552 may correspond to a location of a device that initiates the request, the node 554 may correspond to an amount associated with the request, the node 556 may correspond to a time when the request was initiated, and so forth.

Although only one hidden layer is shown for the artificial neural network 530, it has been contemplated that the artificial neural network 530 used to implement the variational autoencoder used by the features embedding module 304 may include as many hidden layers as necessary. Importantly, one of the hidden layers 534 may include a number of nodes that represent the attribute representations (e.g., embedded features) for the input features. In this example, the artificial neural network 530 is configured to embed the features into two attribute representations, as indicated by the two nodes 546 and 548 in the hidden layer 534. In some embodiments, each of the nodes 546-548 in the hidden layer 534 generates a representation, which may include a mathematical computation (or algorithm) that produces a value based on the input values received from the nodes 538-544. The mathematical computation may include assigning different weights to each of the data values received from the nodes 538-544. The nodes 546 and 548 may include different algorithms and/or different weights assigned to the data variables from the nodes 538-544 such that the nodes 546-548 may produce different values based on the same input values received from the nodes 538-544. In some embodiments, the weights that are initially assigned to the features (or input values) for each of the nodes 546-548 may be randomly generated (e.g., using a computer randomizer). The values generated by the nodes 546 and 548 may be used by the nodes 550-556 in the output layer 536 to re-produce the set of input values for the artificial neural network 530.

The artificial neural network 530 may be trained by using training data. By providing training data to the artificial neural network 530, the nodes 546-548 in the hidden layer 534 may be trained (adjusted) such that the output layer 536 may accurately re-produce the set of input values received at the input layer 532 based on the values in the nodes 546-548 of the hidden layer 534. When the artificial neural network 530 can accurately re-produce the set of input values based on the values (attribute representations) in the hidden layer 534, it is an indication that the values (attribute representations) in the hidden layer 534 represents the set of input values correctly. In other words, the values (attribute representations) in the hidden layer 534 embeds the set of input features accurately. By continuously providing different sets of training data, and penalizing the artificial neural network 530 when the outputs of the artificial neural network 530 are incorrect (e.g., when the output values do not match the input values), the artificial neural network 530 (and specifically, the representations of the nodes in the hidden layer 534) may be trained (adjusted) to improve its performance in features embedding. Adjusting the artificial neural network 530 may include adjusting the weights associated with each node in the hidden layer 534.

Figure 6:
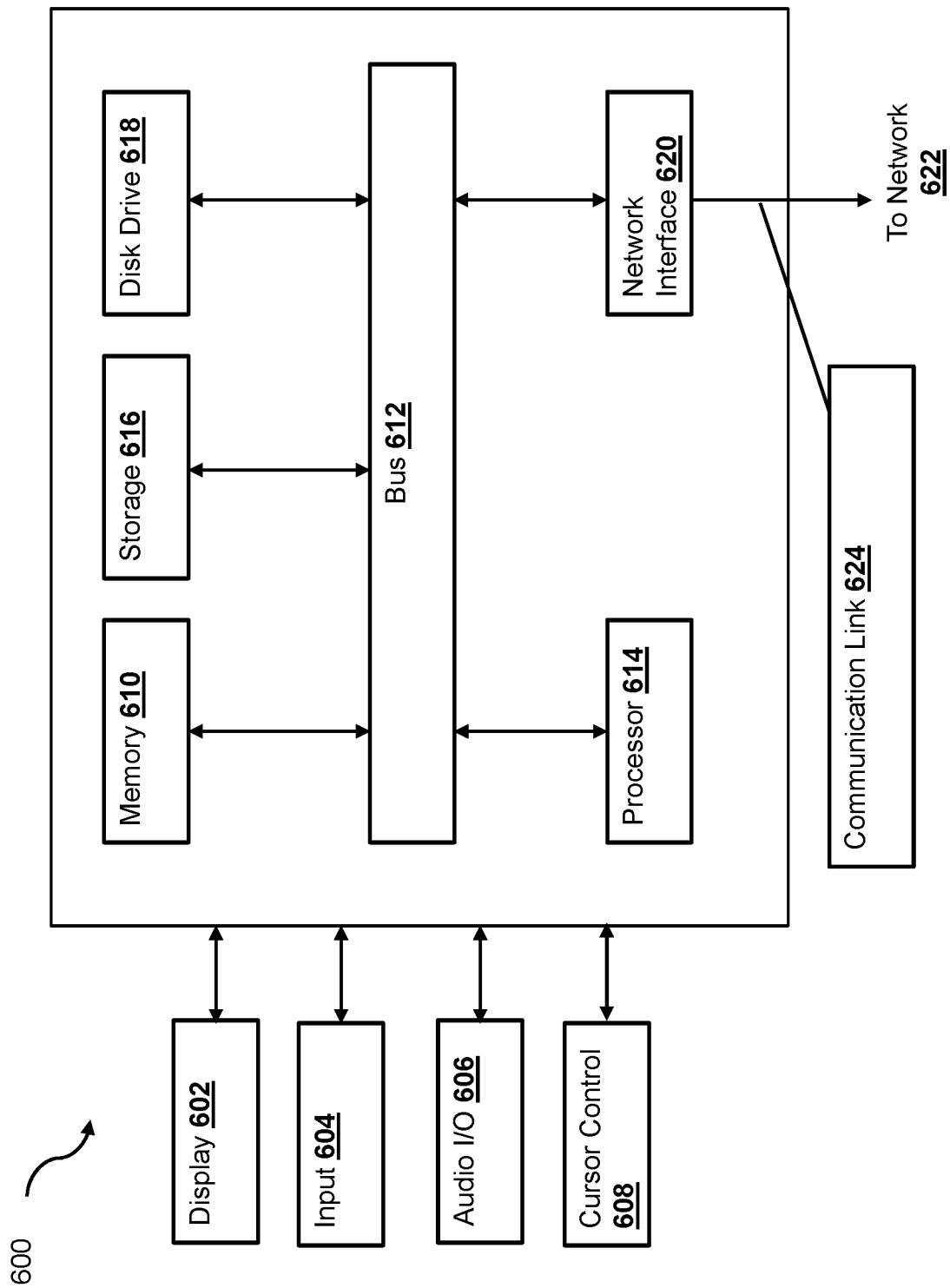
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the model generation functionalities described herein according to the process 400.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
 a non-transitory memory; and
 one or more hardware processors coupled with the non-transitory memory and configured to read instructions from the non-transitory memory to cause the system to perform operations comprising:
   obtaining a first training data set usable for training a computer-based classification model, wherein the computer-based classification model is configured to classify data into one of a plurality of classifications comprising a first classification and a second classification, wherein the first training data set comprises a plurality of training data records, and wherein each training data record in the first training data set is labeled with a respective classification from the plurality of classifications;

grouping the first training data set into a first plurality of clusters based on attributes associated with the plurality of training data records;

determining, for each cluster in the first plurality of clusters, a corresponding ratio between a first count of training data records in the cluster that are labeled with the first classification and a second count of training data records in the cluster that are labeled with the second classification;

identifying, from the first plurality of clusters and based on the determined corresponding ratios, a first cluster having a first corresponding ratio below a first threshold ratio; and generating a second training data set based on the first training data set, wherein the generating comprises removing, from the first training data set, one or more training data records in the first cluster based on a difference between the first corresponding ratio and the first threshold ratio.

2. The system of claim 1, wherein the operations further comprise training the computer-based classification model using the second training data set.

3. The system of claim 1, wherein the operations further comprise:

determining an overall classification ratio between training data records that are labeled with the first classification in the first training data set and training data records that are labeled with the second classification in the first training data set; and calculating the first threshold ratio based on the overall classification ratio.

4. The system of claim 3, wherein the first threshold ratio is a fraction of the overall classification ratio.

5. The system of claim 1, wherein the operations further comprise:

grouping the second training data set into a second plurality of clusters;

determining, for each cluster in the second plurality of clusters, a corresponding ratio between a third count of training data records in the cluster that are labeled with the first classification and a fourth count of training data records in the cluster that are labeled with the second classification;

identifying, from the second plurality of clusters, a second cluster having a second corresponding ratio below a second threshold ratio; and generating a third training data set based on the second training data set, wherein the generating the third training data set comprises removing from the second training data set, one or more second training data records in the second cluster.

6. The system of claim 5, wherein the second threshold ratio is higher than the first threshold ratio.

7. The system of claim 5, wherein the operations further comprise calculating the second threshold ratio based on the first threshold ratio.

8. The system of claim 7, wherein the operations further comprise determining whether the second threshold ratio exceeds a predetermined cutoff ratio, wherein the grouping the second training data set, the determining the corresponding ratio for each cluster in the second plurality of clusters, the identifying the second cluster, and the generating the second training data are performed in response to determining that the second threshold ratio does not exceed the predetermined cutoff ratio.

9. A method, comprising:

obtaining, by one or more hardware processors, a training data set for training a neural network, wherein the neural network is configured to classify data into one of a plurality of classifications comprising a first classification and a second classification, wherein the training data set comprises a plurality of training data records, and wherein each training data record in the training data set is labeled with a respective classification from the plurality of classifications;

grouping, by the one or more hardware processors, the training data set into a plurality of clusters;

identifying, by the one or more hardware processors and from the plurality of clusters, a first cluster having a classification ratio between first training data records in the first cluster that are labeled with the first classification and second training data records in the first cluster that are labeled with the second classification exceeding a threshold ratio;

modifying, by the one or more hardware processors, the training data set based on a comparison between the classification ratio and the threshold ratio, wherein the modifying comprises removing at least a portion of a first plurality of training data records in the first cluster from the training data set; and training the neural network using the modified training data set.

10. The method of claim 9, further comprising classifying incoming data using the trained neural network.

11. The method of claim 9, further comprising:

determining an overall classification ratio between training data records that are labeled with the first classification in the training data set and training data records that are labeled with the second classification in the training data set; and calculating the threshold ratio based on the overall classification ratio.

12. The method of claim 9, wherein each training data record in the training data set comprises a set of attributes, wherein the training data set is grouped into the plurality of clusters based on the set of attributes.

13. The method of claim 12, wherein the operations further comprise embedding, for each training data record in the training data set, the set of attributes in a set of attribute representations, wherein the set of attribute representations is smaller than the set of attributes.

14. The method of claim 13, wherein the set of attribute representations is generated from the set of attributes using a variational autoencoder.

15. The method of claim 13, wherein the first training data set is grouped into the plurality of clusters based on the set of attribute representations.

16. A non-transitory machine-readable medium having stored thereon machine-readable instructions executable to cause a machine to perform operations comprising:

obtaining a first training data set usable for training a computer-based classification model, wherein the computer-based classification model is configured to data into one of a plurality of classifications comprising a first classification and a second classification, wherein the first training data set comprises a plurality of training data records, and wherein each training data record in the first training data set is labeled with a respective classification from the plurality of classifications;

grouping the first training data set into a first plurality of clusters based on attributes associated with the plurality of training data records;

determining, for each cluster in the first plurality of clusters, a corresponding ratio between a first number of training data records in the cluster that are labeled with the first classification and a second number of training data records in the cluster that are labeled with the second classification;

identifying, from the first plurality of clusters and based on the determined corresponding ratios, a first cluster having a first corresponding ratio below a first threshold ratio; and generating a second training data set based on the first training data set, wherein the generating comprises removing, from the first training data set, one or more training data records in the first cluster based on a difference between the first corresponding ratio and the first threshold ratio.

17. The non-transitory machine-readable medium of claim 16, wherein the operations further comprise training the computer-based classification model using the second training data set.

18. The non-transitory machine-readable medium of claim 16, wherein the operations further comprise:

determining an overall classification ratio between training data records that are labeled with the first classification in the first training data set and training data records that are labeled with the second classification in the first training data set; and calculating the first threshold ratio based on the overall classification ratio.

19. The non-transitory machine-readable medium of claim 16, wherein the operations further comprise:

grouping the second training data set into a second plurality of clusters;

determining, for each cluster in the second plurality of clusters, a corresponding ratio between a third number of training data records in the cluster that are labeled with the first classification and a fourth number of training data records in the cluster that are labeled with the second classification;

identifying, from the second plurality of clusters, a second cluster having a second corresponding ratio below a second threshold ratio;

generating a third training data set based on the second training data set, wherein the generating the third training data set comprises removing, from the second training data set, one or more second training data records in the second cluster; and training the computer-based classification model using the third training data set.

20. The non-transitory machine-readable medium of claim 19, wherein the second threshold ratio is higher than the first threshold ratio.

\* \* \* \* \*